3,471,529
METHOD OF PRODUCING 3-KETO-4,6-BISDEHYDRO-6-HALO STEROIDS OF THE ANDROSTANE AND PREGNANE SERIES AND INTERMEDIATES USEFUL THEREFOR
Pieter Westerhof and Jan Hartog, Weesp, Netherlands, assignors, by mesne assignments, to U.S. Philips Corporation, New York, N.Y., a corporation of Delaware
No Drawing. Filed June 27, 1966, Ser. No. 560,872
Claims priority, application Great Britain, June 30, 1965, 27,735/65
Int. Cl. C07c *167/00, 169/14, 169/26*
U.S. Cl. 260—397.3                                3 Claims

ABSTRACT OF THE DISCLOSURE 3-keto-4-dehydro-6,6-dihalo-steroids of the pregnane or androstane series are dehydrohalogenated to form the corresponding 4,6-bisdehydro-6-halo steroids. The intermediates may be produced by the enoletherification at position 3 of a 3-keto-4-dehydro-6-halo steroid. The compounds as produced have progestational, pituitary inhibiting or anabolic activity.

---

The invention relates to a method of producing 3-keto-4,6-bisdehydro-6-fluoro- (or 6-bromo- or 6-chloro)-(9β,10α)-steroids in which method 3-keto-4-dehydro-6,6-dihalogeno(9β,10α)-steroids are used as intermediates or as starting materials. The notation "(9β,10α)" is used to indicate that the steroids of our process invention either belong to the normal steroid or to the 9β,10α-steroid series. Normal steroids are those steroids which have at the asymmetric carbon atoms 8, 9, 10, 13 and 14 the configuration 8β, 9α, 10β, 13β, 14α. The configuration of the 9β,10α-steroids differ at the carbon atoms 9 and 10 from the configuration of the normal steroids at these carbon atoms. The configuration of these 9β,10α steroids is 8β, 9β, 10α, 13β, 14α. In the said 3-keto-4-dehydro-6,6-dihalogeno(9β,10α)-steroids one halogeno atom is taken from the group consisting of fluorine, chlorine and bromine and the other one from the group consisting of chlorine, bromine and iodine.

The compounds as produced according to our process have valuable hormonal properties e.g. progestational, pituitary inhibiting or anabolic activities as shown in Belgian patent specifications 654,437 and 652,597.

3 - keto - 4-dehydro-6,6-dihalogeno-(9β,10α)-steroids as aforesaid may be produced by one of the following methods.

(1) A 3-keto-4-dehydro-6-fluoro- or 6-bromo- or 6-chloro-(9β,10α)-steroid may be brominated, chlorinated or iodinated in allylic position with respect to the double bond with a suitable halogenating agent, such as for example elemental chlorine or bromine, N-bromo- or N-chloro- or N-iodo-succinimide, N-dibromo, or N-dichlorodimethyl-hydantoin, N-dichloro- or N-dibromo-benzenesulfonamide or pyridine-perbromide or pyridine perchloride.

(2) A 3,5-bisdehydro-3-enolether of a 3-keto-4-dehydro-6-fluoro (or-6-bromo or -6-chloro)-(9β,10α)-steroid may be reacted with a chlorinating or a brominating agent as mentioned under (1) above or with perchloryl fluoride.

The starting materials of these reactions 1 and 2 as well as the halogenating methods are known per se. Hitherto, it has been proposed to prepare 3-keto-4,6-bisdehydro-6-halogeno-(9β,10α)-steroids by treatment of a 3-keto-4-dehydro-6-fluoro-(9β,10α)-steroid with 2,3-dichloro-5,6-dicyano benzoquinone or by oxidising an enolether of a 3-keto-4-dehydro-6-halogeno-(fluoro, chloro or bromo)-(9β, 10α)- steroid with $MnO_2$.

Although these methods result to a certain extent into acceptable yields of the desired products a need for further improvement in this respect has been evident.

Such an improvement can be seen in the use of the 6,6-dihalogeno-(9β,10α)-steroids as starting materials or as intermediates.

In its simplest form the invention consists of a method of dehydrohalogenating a 3-keto-4-dehydro-6,6-dihalogeno-(9β,10α)-steroid as aforesaid to produce a 3-keto-4,6-bisdehydro-6-halogeno-(9β,10α)-steroid. The dehydrohalogenating step may be carried out in the conventional manner, e.g. by using an organic amine e.g. a tertiary amine such as pyridine, collidine, dimethylaniline or diethylaniline. It is also possible to use finely powdered calcium oxide or lithium halide e.g. LiCl or LiBr in dimethylformamide whether or not in the presence of lithium carbonate.

This method provides good yields of the desired 3-keto-4,6-bisdehydro-6-halogeno-(6-fluoro, chloro- or bromo)-(9β,10α)-steroids.

Special advantages of this method become apparent when it is combined with a process of preparing the starting material of the aforesaid method. Such starting materials (3 - keto - 4 - dehydro-6,6-dihalogeno-(9β,10α)-steroids) may be prepared by enoletherification at position 3 of a 3-keto-4-dehydro-6-fluoro (or 6-chloro- or 6-bromo)-(9β,10α)-steroid followed by halogenation (fluorination, chlorination, bromination or iodation). Thus in a more refined form the invention consists of a method of producing 3 - keto - 4,6 - bisdehydro - 6-halogeno-(fluoro-, chloro- or bromo-)-(9β,10α)-steroids comprising the steps enoletherification at carbon atom 3 of 3-keto-4-dehydro-6-halogeno-(fluoro-, chloro- or bromo-)-(9β,10α)-steroids followed by halogenating (chlorinating, brominating or iodinating) the thus produced 3-enolether-3,5-bisdehydro-6-halogeno-(9β,10α)-steroid to produce a 3-keto-4-dehydro-6,6-dihalogeno-(9β,10α)-steroid as aforesaid and finally followed by dehydrohalogenating the meant 6,6-dihalogeno-(9β,10α)-steroid.

This process gives relatively high yields of 3-keto-4,6-bisdehydro-6-halogeno(fluoro-, chloro- or bromo)-(9β, 10α)-steroids when calculated on the base of 3-keto-4-dehydro-6-halogeno-(fluoro-, chloro- or bromo)-(9β,10α)-steroids as starting materials, in particular, when the halogeno atom of the starting material is a fluorine atom.

One of the advantages of this 3-step process is that it may be realized without working up the intermediately formed products. Thus the halogenation can be carried out by the addition of the halogenating agent to the reaction mixture of the enoletherification reaction; in the thus resulting reaction mixture the dehydrohalogenation reaction may take place.

Enoletherification as meant herebefore may conveniently be carried out with an orthoformate ester in the presence of a catalyst, e.g. with ethylorthoformate and hydrochloric acid or with ethylorthoformate and p-toluene sulphonic acid.

Halogenation may take place with one of the herebefore given fluorinating, chlorinating, brominating or iodinating methods.

For the introduction of the second halogeno atom the halogenation with an N-halo imide is the preferred process. Introduction of the iodo atom at carbon atom 6 may be carried out with N-iodo succinimide or with N-iodobenzenesulfonamide.

The dehydrohalogenation reaction may take place in the usual manner e.g. with an organic tertiary amine such as collidine, pyridine, dimethyl- or diethylaniline. It is also possible to use finely powdered calcium oxide, or lithium halide e.g. LiCl or LiBr in dimethylformamide. In general this latter method gives somewhat higher yields than the one in which an organic base is used whether or not in the presence of lithium carbonate.

The method according to the invention is in particular of advantage for the production of 3-keto-4,6-bisdehydro-6-fluoro(9β,10α)-steroids.

In case both 6-halogen atoms are different from each other it should be borne in mind that HI is more easily split off than HBr which latter molecule is more easily removed than HCl. Under conventional conditions for dehydro halogenation, the 6-fluorine atom is not split off if the other 6-halogeno atom is either chlorine, bromine or iodine.

Example 1

A solution of 1.18 gms. of 6β-bromo-9β,10α-pregn-4-en-3,20-dione and 50 mgms. of p-toluenesulphonic acid in a mixture of 5 ml. of methylene chloride, 20 ml. of purified dry dioxan and 1.2 ml. of freshly distilled ethylorthoformate, was allowed to stand at room temperature for 20 hours. After dilution with 300 ml. of petroleum ether and addition of 1 ml. of dry pyridine, the reaction mixture was filtered through a column of 20 gms. of silica gel. Elution was completed with 200 ml. of a mixture of benzene and petroleum ether (1:3). The filtration procedure was repeated through another 20 gms. of silica gel. After evaporating off the solvent in vacuo, a yield of 0.8 gm. of oily 3-ethoxy-6-bromo-9β,10α-pregna-3,5-dien-20-one was obtained.

The 3-enolether was dissolved in 30 ml. of acetone at 0° C. and was then brominated by the successive addition with stirring at 0° C. of a solution of 0.34 gm. of sodium acetate in 3.4 ml. of water, 0.8 gm. of N-bromosuccinimide and 0.3 ml. of acetic acid. Stirring was continued for 30 minutes, and the reaction mixture then worked up by dilution with 200 ml. of ice-water and extraction with methylene chloride. The extract was washed successively with water, a sodium bicarbonate solution, and again with water. Evaporating off the solvents after addition of 0.1 ml. of pyridine gave oily 6,6-dibromo-9β,10α-pregn-4-en-3,20-dione.

The 6,6-dibromo product was dissolved into 2 ml. of dry pyridine and the resulting solution was heated at 90° C. for 45 minutes. Working up gave 0.8 gm. of a crude product, which was chromatographed through a column of 15 gms. of silica gel. The column was eluted with mixtures of benzene and acetone containing increasing quantities of the latter solvent. From the appropriate fraction 0.4 gm. of impure 6-bromo-9β,10α-pregna-4,6-dien-3,20-dione was obtained. Recrystallization from ethanol yielded 0.25 gm. of the pure compound. Melting point: 107–108° C. (dec., vac.) $\epsilon(\lambda_{maximum}=292\ m\mu)$ =19,000. $[\alpha]_D^{25}=-321°$ (CHCl$_3$).

Example 2

1.18 gms. of 6β-bromo-9β,10α-pregn-4-en-3,20-dione were etherified in the same manner as described in Example 1. After the reaction mixture had stood for 24 hours, 30 ml. of acetone were added and the solution obtained was cooled to 0°C. and then brominated with N-bromosuccinimide. The 6,6-dibromo-9β,10α-pregn-4-en-3,20-dione obtained was dehydrobrominated and worked up also as described in Example 1. By this procedure the yield of 6-bromo-9β,10α-pregna-4,6-dien-3,20-dione was improved to 0.40 gm.

Example 3

6β-bromo-9β,10α-pregn-4-en-3,20-dione was etherified as described in the foregoing Example 2. In this experiment, however, the bromination was carried out by means of bromine in equivalent amounts. After dehydrobromination of the 6,6-dibromo-9β,10α-pregn-4-en-3,20-dione and working up, 0.35 gm. of 6-bromo-9β,10α-pregna-4,6-dien-3,20-dione was obtained.

Example 4

To a solution of 0.814 gm. of 6β-chloro-17α-hydroxy-9β,10α-pregn-4-en-3,20-dione 17-acetate in 15 ml. of dry dioxan, there were added, whilst stirring, 0.7 ml. of ethyl orthoformate and 28 mgms. of p-toluenesulphonic acid. The solution was allowed to stand at room temperature in the dark for 22 hours. After cooling to 0° C., 20 ml. of cold acetone, a solution of 0.2 gm. of dry sodium acetate in 2 ml. of water, 0.75 gm. of N-bromosuccinimide and 0.2 ml. of acetate acid were added, whilst stirring, to the solution of the 3-enolether in the order given. After stirring for one hour, the reaction mixture was poured out into water and extracted with benzene-ether. The combined extracts were washed with a sodium bicarbonate solution and with water. Drying and evaporation of the solvent in vacuo yielded a brownish resin with an $a(1\%, 1\ cm.)=230$ at 236.5 m$\mu$ substantially representing 6-bromo-6-chloro-17α-hydroxy-9β,10α-pregn-4-en-3,20-dione 17-acetate.

A solution of the said resin product in 5 ml. of pyridine was heated at approximately 95° C. for one hour. Working up in the usual way yielded 0.66 gm. of a residue, which was chromatographed through a column of 12 gm. of silica gel. From the appropriate fraction 0.48 gm. of 6-chloro-17α-hydroxy-9β,10α-pregna-4,6-diene-3,20-dione 17-acetate was obtained. Recrystallisation from ethanol yielded the pure compounds.

Melting point: 150–151° (dec.) $\epsilon(\lambda_{maximum}=286\ m\mu=20,800.\ [\alpha]_D^{25}=-401°$ (CHCl$_3$).

Example 5

A solution of 9.2 gms. of 6β-fluoro-9β,10α-pregn-4-en-3,20-dione and 0.37 gm. of p-toluenesulphonic acid in 185 ml. of dry purified dioxan and 9.2 ml. of ethyl orthoformate, was allowed to stand at room temperature in the dark for 24 hours. The reaction mixture was cooled to 0° C. and 300 ml. of acetone at 0° C. were added. The 3-enolether was then brominated by successive addition at 0° C. with stirring, of a solution of 3.4 gm. of sodium acetate in 34 ml. of water, then 8.2 gm. of N-bromosuccinimide, and finally 3 ml. of acetic acid. After stirring at 0° C. for a further 30 minutes, the reaction mixture was worked up by diluting with 2 litres of ice-water and extracting with methylene chloride and petroleum ether. The extract was washed successively with water, a sodium bicarbonate solution and again with water. Evaporation of the solvents after addition of 1 ml. of pyridine gave a residue of 6-bromo-6-fluoro-9β,10α-pregn-4-en-3,20-dione. This residue was dissolved in 10 ml. of pyridine, and the resulting solution heated at 90° C. for 45 minutes. Work-up as usual gave 8.1 gms. of a dark brown-colored resin.

Chromatography through a column of 150 gms. of silica gel gave 4.53 gms. of product from the appropriate fraction. Recrystallization from ethanol at —25° C. yielded 3.70 gms. of 6-fluoro-9β,10α-pregna-4,6-dien-3,20-dione.

Melting point: 177–178.5° C. $\epsilon(\lambda_{maximum}=285\ m\mu)$ =23,600. $[\alpha]_D^{25}=-263°$ (CHCl$_3$).

Example 6

To a solution of 10 gms. of a mixture of 6α- and 6β-fluoro-17α-hydroxy-9β,10α-pregn-4-en-3,20-dione 17-acetate in 200 ml. dry purified dioxan were added 10 ml. of ethyl orthoformate and 400 mgms. of p-toluenesulphonic acid. After standing at room temperature for 24 hours, the reaction mixture was cooled to 0° C. and to it were subsequently added 300 ml. of acetone at 0° C., a solution of 3.4 gms. of sodium acetate in 34 ml. of water also cooled to 0° C., 9.2 gms. of powdered N-bromosuccinimide and 3.3 ml. of acetic acid. The reaction mixture was stirred at 0–5° C. for 30 minutes and then worked up. The 6-bromo-6 - fluoro - 17α - hydroxy - 9β,10α - pregn - 4 - en - 3,20-dione 17-acetate product was dehydrohalogenated in approximately 30 ml. of pyridine by heating at 90° C. for one hour. Working up as usual gave 9.26 gms. of a residue with an $a(1\%, 1\ cm.)=438$ at 284 m$\mu$. Chromatography through a column of 150 gms. of silica gel gave after recrystallization of the appropriate fractions 4.8 gms. of 6-fluoro - 17α - hydroxy - 9β,10α - pregna - 4,6 - diene - 3, 20-dione 17-acetate. Melting point: 182.5–184.5° C. $\epsilon(\lambda_{maximum}=285$ m$\mu)=24,000$.

Example 7

Using the same procedure as described in Example 6, 1 gm. of a mixture of 6α- and 6β-fluoro-17α-hydroxy-9β, 10α-pregn-4-en-3,20-dione 17-acetate was enoletherified. After the addition of acetone at 0° C., halogenation was carried out with an equivalent amount of N-iodo-succinimide. Work-up, dehydroiodination of the 6-iodo-6-fluoro-17α-hydroxy-9β,10α-pregn-4-en-3,20-dione 17-acetate with collidine, and again working up as described in Example 6, finally gave 0.45 gm. of 6-fluoro-17α-hydroxy-9β,10α-pregna-4,6-dien-3,20-dione 17-acetate.

Example 8

3 gms. of 6β-fluoro-17β-hydroxy-9β,10α-androst-4-en-3-one 17-acetate were dissolved into a solution of 120 mgms. of p-toluene sulphonic acid in a mixture of 60 ml. of dry purified dioxan and 3 ml. of freshly distilled ethyl orthoformate. The reaction mixture was kept at approximately 15° C. in the dark for 20 hours, after which it was cooled to 0° C. after the addition of 90 ml. of acetone. Then while stirring 1 g. of sodium acetate in 10 ml. of water, 3 gms. of finely powdered N-bromosuccinimide and 1 ml. of acetic acid were quickly added, in the sequence given, to the solution of the 3-enolether. Stirring was continued at 0° C. for 45 minutes. Thin-layer chromatography of samples of the reaction mixture at different times of reaction indicated that in about a quarter of an hour the greatest part of the ether had already been converted into the brominated product. After working up 10 ml. of pyridine were added to the residue of 6-bromo-6-fluoro-17β-hydroxy-9β,10α-androst-4-en-3-one 17-acetate and the solution was heated at approximately 90° C. for about one hour.

The residue (2.41 gms.) obtained was combined with that obtained from another identical experiment starting with 5 gms. of 6β-fluoro-17β-hydroxy-9β,10α-androst-4-en-3-one 17-acetate. The combined residues were dissolved in 2 litres of a mixture of benzene-petroleum ether (1:1). This solution was chromatographed through a column of 280 gms. of silica gel. Elution and recrystallization of the appropriate fractions yielded 4.02 gms. of 6-fluoro-17β-hydroxy-9β,10α-androsta-4,6-dien-3-one 17-acetate. Melting point: 156–158° C. $\epsilon(\lambda_{maximum}=285$ m$\mu)=23,400$.

Example 9

1 gm. of 6β-fluoro-17β-hydroxy-9β,10α-androst-4-en-3-one 17-acetate was enoletherified as described in Example 8, and the product worked up as described in Example 1 yielding 0.75 gm. of crude enolether.

To a solution of this enolether fraction in 15 ml. of ether at 0° C. a solution was added to 1.6 gm. of potassium acetate in 30 ml. of 85% aqueous acetic acid. Bromination was carried out by adding with stirring, a solution of 320 mgms. of bromine in 10 ml. of acetic acid in the course of 5 minutes. After stirring for another 5 minutes the reaction mixture was worked up. The product, 6 - bromo - 6 - fluoro - 17β - hydroxy - 9β,10α - androst-4-en-3-one 17-acetate, was dissolved into 10 ml. of pyridine and the solution was heated at 90° C. for 50 minutes. Working up yielded 510 mgms. of a residue. Purification by chromatography through a column of silica gel and recrystallization from ethanol at −25° C. finally yielded 6-fluoro-17β-hydroxy-9β,10α-androsta-4,6-dien-3-one 17-acetate with a melting point of 151.5–152.5° C. and an $a(1\%, 1$ cm.$)=576$ at 284 m$\mu$.

Example 10

9β,10α-androst-4-en-3,17-dione was converted into the 3-pyrrolidino-3,5-dienamine by refluxing in methanol in the presence of pyrrolidine. The crystalline enamine (melting point 123–125° C.) was then reacted with methyl magnesium bromide in tetra-hydrofuran (or ether). After hydrolysis with aqueous methanolic potassium hydroxide at 45° C. for one hour the reaction mixture was worked up to give 17β-hydroxy-17-methyl-9β,10α-androst-4-en-3-one with a melting point of 133–134° C. The latter compound was reacted with isopropenylacetate in benzene in the presence of p-toluenesulphonic acid by refluxing for 4 hours. Work-up and recrystallization yielded 17α-methyl - 9β,10α - androsta - 3,5 - dien - 3,17 - diol 3,17-diacetate with a melting point of 128–130° C. This diacetate was chlorinated in a medium of ether-aqueous acetic acid with chlorine in the presence of sodium acetate at −5° C. Working up yielded crystalline 6β-chloro-17β-hydroxy-17-methyl-9β,10α-androst-4-en-3-one 17-acetate with a melting point of 168–170° C.

This compound was enoletherified as described in Example 4, and the resulting 3-enolether was brominated without intermediate working up, as described in that example. The resulting 6-bromo-6-chloro-17β-hydroxy-17-methyl-9β,10α-androst-4-en-3-one 17-acetate was dehydrobrominated with pyridine at 95° C. for 45 minutes to yield, after working up and recrystallization, 6-chloro-17β-hydroxy-17-methyl-9β,10α-androsta-4,6-dien-3-one 17-acetate with a melting point of 152–153° C.

Example 11

17α-acetoxyprogesterone was 3 enolesterified by reaction with isopropenyl acetate in benzene in the presence of p-toluene-sulphonic acid by refluxing for 4 hours. The diester product, 3,17α-dihydroxy-pregna-3,5-dien-20-one 3,17-diacetate, was chlorinated in ether-aqueous acetic acid with chlorine in the presence of sodium acetate at −5° C. After working up, a mixture of 6α- and 6β-chloro-17α-acetoxyprogesterone was obtained, which, without intermediate purification, was enoletherified and subsequently brominated as described in Example 4 to yield the crude 6-bromo-6-chloro-17α-acetoxyprogesterone. Dehydrobromination by heating of the dihalo-product in pyridine at 95° C. for 40 minutes gave, after working up and purification, 6-chloro-6-dehydro-17α-acetoxy-progesterone with a melting point of 208–210° C. and $\epsilon(\lambda_{maximum}=285$ m$\mu)=22,500$.

Example 12

6α-fluoro-testosterone 17-propionate (or the corresponding 6β-fluoro compound or a mixture of 6α- and 6β-fluoro compounds) (A. Bowers and H. J. Ringold, Tetrahedron 3, 14 (1958)) was enoletherified and subsequently brominated as described in Example 5. The crude 6-bromo-6-fluoro-testosterone 17-propionate was dehydrobrominated by heating in 20 ml. of pyridine at 95° C. for one hour. Working up and purification gave 5.9 gms. of 6-fluoro-6-dehydrostestosterone 17-propionate with a melting point of 122–124° C. and an $\epsilon$ ($\lambda_{maximum}=284$ m$\mu)=23,700$.

Example 13

By the method described in Example 12, 6-fluoro-17α-acetoxy-progesterone (5 gms.) (A. Bowers et al., J. Am. Chem. Soc. 81, 5991 (1959)) was enoletherified, brominated and dehydrobrominated to yield 2.97 gms. of 6-fluoro-6-dehydro-17α-acetoxy-progesterone with a melting point of 227–230° C. and an $\epsilon$ ($\lambda_{maximum}=284$ m$\mu$ $=24,000$.

Example 14

6α-fluoro-17β-hydroxy-9β,10α-androst - 4 - en - 3 - one 17-acetate (15 g.) was enoletherified as given in Example 1. Work-up gave 15.43 g. 3,5-bisdehydro-3-enolether, which was halogenated with N-chlorosuccinimide as described in Example 1. Work-up gave 15.44 g. of an oil, which was carefully chromatographed through a column of 300 g. of silicagel. Rechromatography of the 6-chloro, 6-fluoro fraction through a column of 250 g. of silicagel finally afforded both 6-chloro, 6-fluoro isomers in a pure state after recrystallization of the appropriate fractions from ether.

The analytical data of 6α-chloro-6-fluoro-17β-hydroxy-9β,10α-androst-4-en-3-one 17-acetate are the following: M.P. 145–146° $\epsilon(\lambda_{maximum}=237$ m$\mu)=13,200$. $[\alpha]_D^{25}=-32°$ (chloroform).

Those for 6β - chloro - 6-fluoro-17β10α-androst-4-en-3-one 17-acetate are: M.P. 150.0–152°. $\epsilon(\lambda_{maximum}=237$ m$\mu=11,150$. $[\alpha]_D^{25}=-86°$ (chloroform).

Example 15

6α-chloro, 6-fluoro-17β-hydroxy - 9β,10α - androst - 4-en-3-one 17-acetate (100 mg.) in a solution of 33 mg. of lithium chloride in 13 ml. of dimethyl formamide was heated at 75° for 7 hours. Work-up gave in a yield of 85% the 6-fluoro-9β,10α-androsta-4,6-dien-3-one 17-acetate.

Example 16

6α-chloro, 6-fluoro-17β-hydroxy-9β,10α - androst - 4-en-3-one 17-acetate (600 mg.) was heated in 60 ml. of of refluxing collidine for 7 hours. Work-up afforded in a yield of 77% the 6-fluoro-9β,10α-androsta-4,6 - dien - 3-one 17-acetate.

What is claimed is:

1. A method of producing 3 - keto-4,6 - bisdehydro-6 - halo-9α,10β and 9β,10α steroids of the pregnane and androstane series comprising treating a 3-keto-4-dehydro-6-fluoro, chloro or bromo steroid of the pregnane or androstane series with ethylorthoformate and a catalyst selected from the group consisting of hydrochloric acid and p-toluene sulfonic acid to form the corresponding 3-enolether, treating said 3-enolether with an N-halo imide to form the corresponding 3-keto-4-dehydro-6,6-dihalo steroids and then dehydrohalogenating said 6-6-dihalo steroid to form the corresponding 3-keto-4,6-bisdehydro 6-halo steroid.

2. A compound of the formula

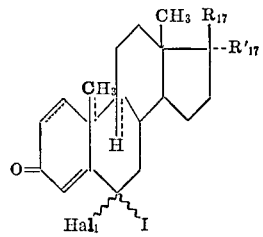

wherein the steroid nucleus has a configuration selected from the group consisting of the 9β,10α steroids and the 9α,10β steroids, carbon atoms and 1 and 2 are joined by single or double carbon to carbon bond, Hal$_1$ is a member selected from the group consisting of fluorine, chlorine and bromine, R$_{17}$ is

and R'$_{17}$ is a member selected from the group consisting of hydrogen, hydroxy and acetoxy or R$_{17}$ is a member selected from the group consisting of hydroxy and acetoxy and R'$_{17}$ is a member selected from the group consisting of hydrogen and methyl.

3. The compound of claim 2 wherein the steroid nucleus has a 9β,10α steroid configuration, carbon atoms 1 and 3 are joined by a single carbon to carbon bond, Hal$_1$ is fluorine, R$_{17}$ is

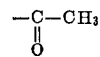

and R'$_{17}$ is a member selected from the group consisting of hydrogen, hydroxy and acetoxy.

References Cited

UNITED STATES PATENTS 3,264,332   8/1966   Gould et al. _ _ _ _ _ _   260—397.45

LEWIS GOTTS, Primary Examiner

ETHEL G. LOVE, Assistant Examiner

U.S. Cl. X.R.

260—239.5, 397.4, 397.5, 999.